United States Patent
Bech-Andersen

(10) Patent No.: US 6,236,689 B1
(45) Date of Patent: May 22, 2001

(54) DEVICE COMPRISING A PHASE-LOCKED LOOP, ELECTRONIC APPARATUS COMPRISING SUCH A DEVICE AND METHOD OF MODULATING THE FREQUENCY OF AN OSCILLATOR

(75) Inventor: Kim Bech-Andersen, Monce en Belin (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/102,477

(22) Filed: Jun. 22, 1998

(30) Foreign Application Priority Data

Jul. 1, 1997 (FR) .................................................. 97 08289

(51) Int. Cl.$^7$ ...................................................... H03D 3/00
(52) U.S. Cl. .......................... 375/334; 332/100; 332/127
(58) Field of Search ................................ 375/334, 272, 375/303, 371, 376; 332/100, 123, 124, 127

(56) References Cited

U.S. PATENT DOCUMENTS

| | | | |
|---|---|---|---|
| 4,538,136 | 8/1985 | Drabing | 340/310 R |
| 4,816,782 * | 3/1989 | Kunitomo et al. | 332/19 |
| 4,870,384 * | 9/1989 | Thomas | 332/123 |
| 5,130,676 * | 7/1992 | Mutz | 332/100 |
| 5,155,454 * | 10/1992 | Amoroso | 332/100 |
| 5,157,358 * | 10/1992 | Benson | 332/100 |

FOREIGN PATENT DOCUMENTS

0577323A1   1/1994   (EP) .............................. H04L/27/12

* cited by examiner

*Primary Examiner*—Stephen Chin
*Assistant Examiner*—Mohammad Ghayour
(74) *Attorney, Agent, or Firm*—Dicran Halajian

(57) ABSTRACT

A frequency shift keying device includes a reference oscillator which provides a reference signal, and a controlled oscillator having a control input and an output signal. A phase detector compares the output phase of the output signal with a reference phase of the reference signal to form an error signal on a detector output of the phase detector. The error signal provides phase locking of the output signal. A compensation circuit having a compensation input is connected to a modulation output of a modulation source which outputs a modulation signal. The compensation circuit also has a compensation output connected to the detector output. The compensation circuit provides a compensation signal which counteracts the error signal to form a modified error signal for attenuating the phase locking so that it becomes possible to modulate the controlled oscillator at a low rate without disturbing the sound spectrum which is also transmitted using a carrier generated by the controlled oscillator.

5 Claims, 1 Drawing Sheet

DEVICE COMPRISING A PHASE-LOCKED LOOP, ELECTRONIC APPARATUS COMPRISING SUCH A DEVICE AND METHOD OF MODULATING THE FREQUENCY OF AN OSCILLATOR

FIELD OF THE INVENTION

The invention relates to a frequency shift keying device having an input for frequency shift keying and a phase locked loop notably formed by:
  a reference oscillator
  a frequency-controlled oscillator having a frequency control input,
  a phase detector for comparing the phase of the output signals of said controlled oscillator with those of the output of the reference oscillator.

The present invention relates to an electronic apparatus such as a mobile radio telephone comprising such a device.

The invention also relates to a method of frequency modulating an oscillator to which a phase-locked loop is added.

BACKGROUND OF THE INVENTION

The problem posed in a conventional frequency shift keying a device is that it is difficult to modulate the frequency of the carrier because of the fact that the control loop is opposed to any frequency variation.

This type of modulation is imposed on mobile radios which form part of a network that satisfies a prevailing NAMPS standard, notably on United States of America territory. This modulation is intended for the transmission of signaling data for the network.

SUMMARY OF THE INVENTION

The invention proposes a frequency shift keying device which lends itself well to a change of the carrier frequency for transmitting information.

Therefore, a frequency shift keying device is provided with a compensation circuit; for at least attenuating the phase locking during the periods of frequency shift keying.

The idea of the invention is based on the fact that the frequency modulation to be provided is considered a disturbance of the frequency of the oscillator and that a compensation is provided for destroying or for counteracting at least partly this disturbance to avoid the effect of servo control of the loop.

These and other aspects of the invention will be apparent from and elucidated with reference to the embodiments described hereinafter.

DETAILED DESCRIPTION OF THE DRAWINGS

Figure 1:
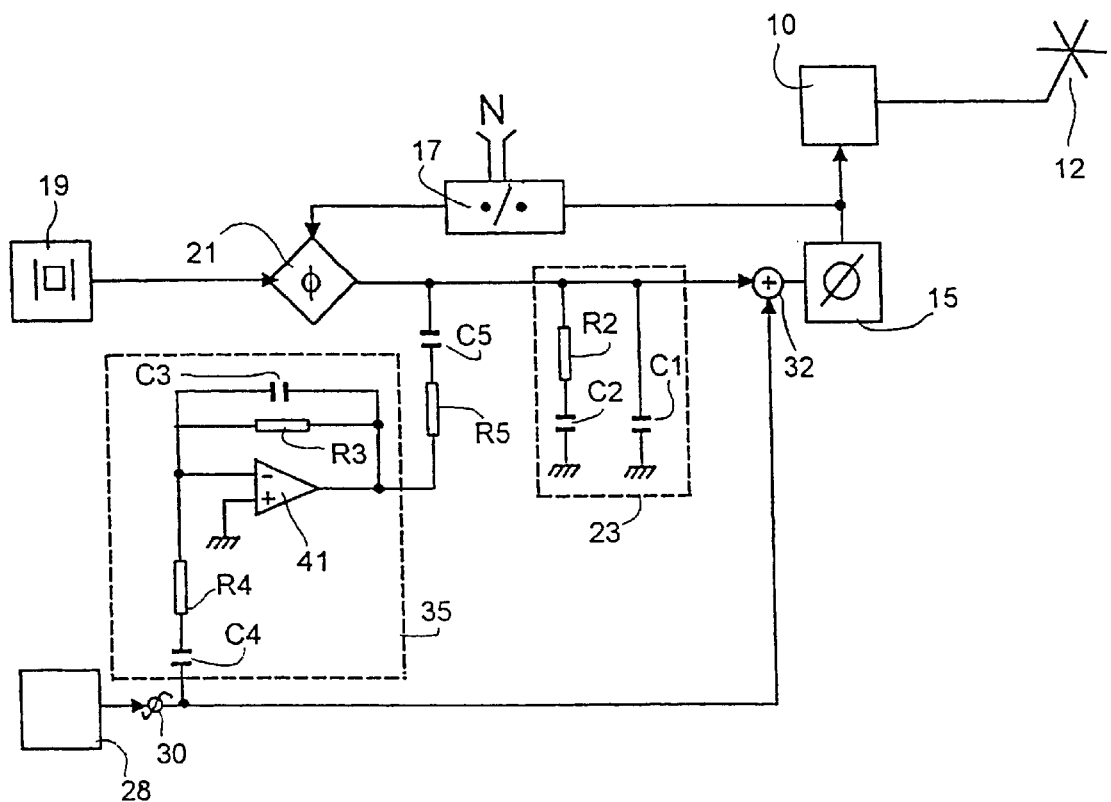
FIG. 1 shows a device according to the invention.

FIG. 1 diagrammatically shows an electronic apparatus and, more precisely, a mobile radio telephone used in cellular networks such as those defined by the aforesaid NAMPS standards. This apparatus comprises a radio part 10 with which waves are transmitted and received via an antenna 12. This radio part 10 is controlled by the output signals of a frequency-controlled oscillator 15 known as VCO. This oscillator is phase controlled by a locked loop comprising the following elements:
  a frequency divider 17 for dividing the frequency of the output signals of the oscillator in accordance with a dividing factor N which varies as a function of the use,
  a reference oscillator 19 formed by a quartz in accordance with customary technologies,
  a phase detector 21 of which the output signals are led to the frequency-controlled oscillator via a loop filter 23. This loop filter is formed, on the one hand, by a capacitor C1 connected in parallel to the output of the phase detector 21 and, on the other hand, by a connection, also in parallel, to the output of the phase detector, comprising a series combination of a resistor R2 and a capacitor C2.

For transmitting low-rate data, the frequency of the oscillator 15 is to be changed, for example, for transmitting digital signals, this frequency deviates of the order of 700 Hz at a rate of about 100 Hz for a quiescent value of the order of 900 MHz. These modulation signals come from a modulation source 28 which applies its signals to the modulation input terminal 30. These signals are applied to the frequency-controlled oscillator 15 through a signal adder 32.

Figure 2:
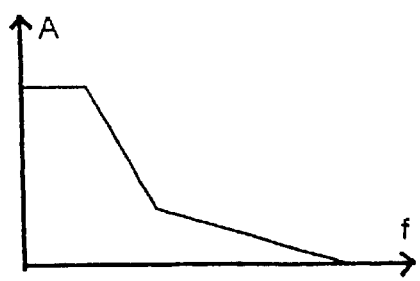
FIG. 2 shows a response curve of a phase-controlled circuit.

In FIG. 2 is shown the response curve of such a phase-locked loop. Along the Y ordinate is plotted the gain A of the loop and along the X axis the frequency f under consideration. In this curve there is taken into account that the gain is the highest at the low frequencies and that the loop is opposed to the frequency shift keying of this oscillator 15.

According to the invention, a compensation circuit 35 is provided for nevertheless permitting this frequency change.

This circuit 35 is formed by an integrator circuit with an inverting effect. This integrator is formed on the basis of an amplifier 41. To this amplifier is added a negative feedback arranged between its output and its inverting input and formed by a series combination of a resistor R3 and a capacitor C3. This negative feedback is completed by a resistor R4 connected in series to a capacitor C4 for receiving the modulation. The output of this amplifier is connected to the output of the phase detector 21 via a resistor R5 connected in series to a capacitor C5. The capacitors C4 and C5 are capacitors having a relatively high value and are used, inter alia, as bypass capacitors. The value of R5 is high enough so as not to disturb the function of integrator of the circuit 35.

Thus, when a modulation is applied to the terminal 30, it is first applied to the oscillator 15. It will thus have a tendency to drift and the loop will correct this by producing a correction signal whose shape is given by the integral of the disturbance signal which is the result of the modulation.

According to the invention, the circuit 35 will create a countervoltage which will be opposed to the correction provided by the loop. As a result, the frequency of the oscillator will change as the effect of the disturbance is as it were canceled. Obviously, the transfer function of the circuit 35 depends on the characteristic features of the frequency response function of the phase-locked loop.

It will be noted that the capacitor C5 avoids that the compensation circuit prolongs its effects to more than one too long period and that the resistor R4 permits the juxta-position without a detrimental effect of the signals on the outputs of the phase detectors 21 and of the circuit 35.

Moreover, as the phase detector behaves like a current source, an integration function is created with the capacitor C1.

The integrator formed by the circuit 35 is optimized for obtaining the maximum compensation at the desired low frequencies. Thus, the effects provided in the sound spectrum, which in fact contains the speech signals, are so small that the measures provided by the invention do not degrade this sound spectrum at all.

What is claimed is:

1. A frequency shift keying device comprising:

a reference oscillator which provide a reference signal;

a controlled oscillator having a control input and an output signal;

a phase detector which compares an output phase of said output signal with a reference phase of said reference signal to form an error signal on a detector output of said phase detector, said error signal providing phase locking of said output signal;

a modulation source which outputs a modulation signal on a modulation output;

a compensation circuit having a compensation input connected to said modulation output and a compensation output connected to said detector output, said compensation circuit providing a compensation signal which counteracts said error signal to form a modified error signal for attenuating said phase locking; and an adder which adds said modified error signal and said modulation signal to form said control signal provided to said controlled oscillator on said control input.

2. The frequency shift keying device of claim 1, wherein said compensation circuit includes an integrator for compensating a modulation disturbance of said controlled oscillator caused by said modulation signal.

3. A mobile radio comprising a frequency shift keying device, said frequency shift keying device comprising:

a reference oscillator which provide a reference signal;

a controlled oscillator having a control input and an output signal;

a phase detector which compares an output phase of said output signal with a reference phase of said reference signal to form an error signal on a detector output of said phase detector, said error signal providing phase locking of said output signal;

a modulation source which outputs a modulation signal on a modulation output;

a compensation circuit having a compensation input connected to said modulation output and a compensation output connected to said detector output, said compensation circuit providing a compensation signal which counteracts said error signal to form a modified error signal for attenuating said phase locking; and an adder which adds said modified error signal and said modulation signal to form said control signal provided to said controlled oscillator on said control input.

4. The mobile radio of claim 3, wherein said compensation circuit includes an integrator for compensating a modulation disturbance of said controlled oscillator caused by said modulation signal.

5. A method of frequency shift keying comprising:

providing a reference signal from a reference oscillator;

providing a control signal to a controlled oscillator which outputs an output signal;

comparing an output phase of said output signal with a reference phase of said reference signal to form an error signal on a detector output of a phase detector, said error signal providing phase locking of said output signal;

providing a modulation signal from a modulation source on a modulation output;

providing a compensation signal from a compensation circuit having a compensation input connected to said modulation output and a compensation output connected to said detector output, said compensation signal counteracting said error signal for attenuating said phase locking; and adding said modified error signal and said modulation signal to form said control signal.

* * * * *